United States Patent Office 3,679,507
Patented July 25, 1972

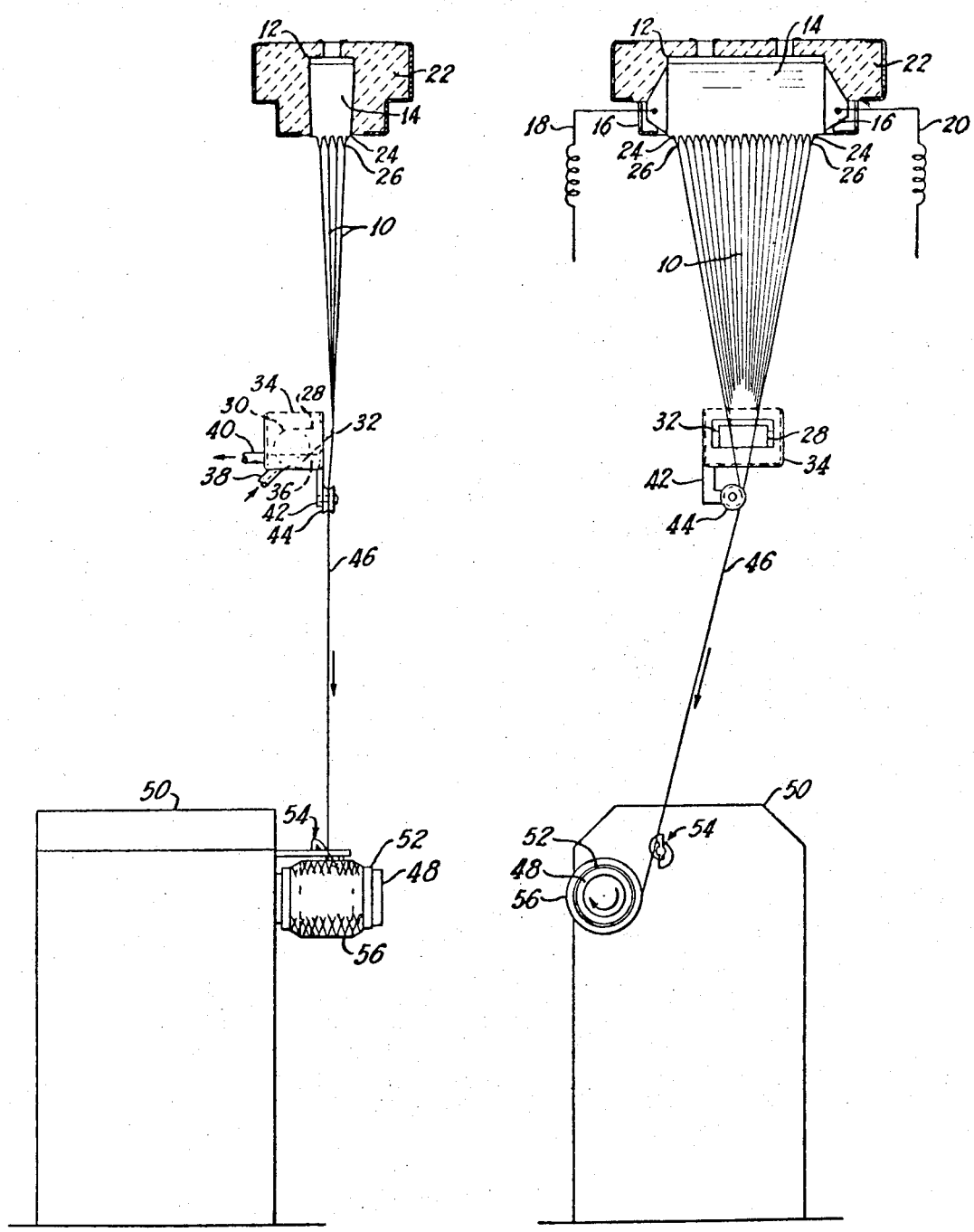

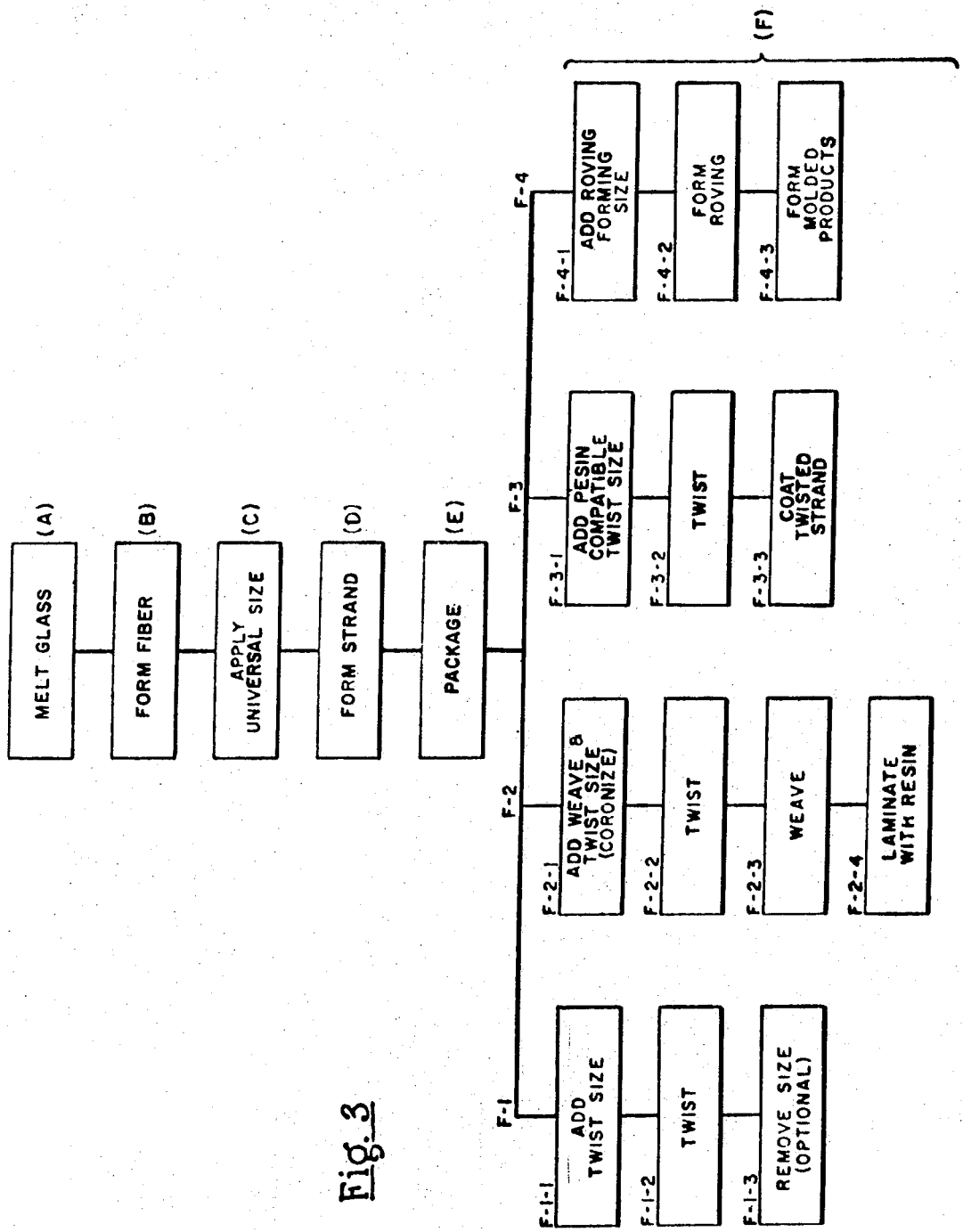

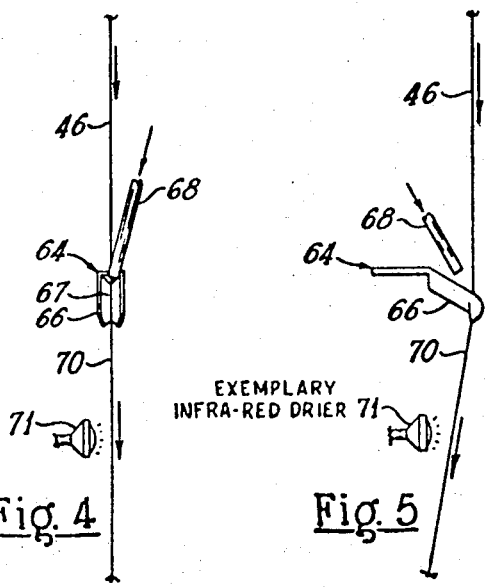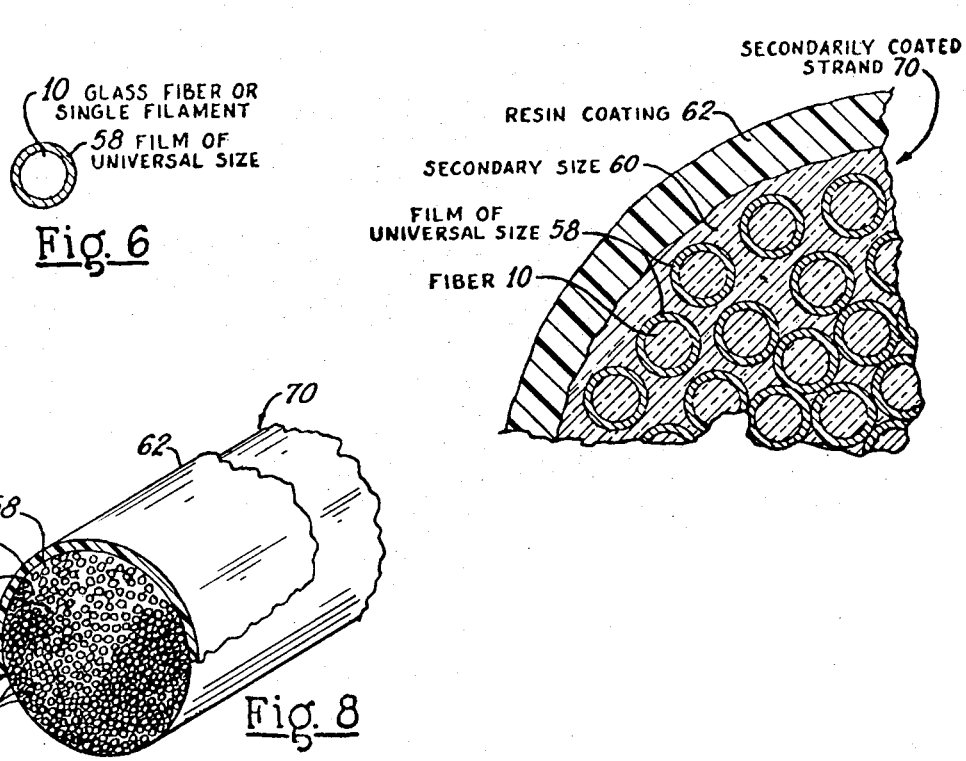

3,679,507
METHOD OF PRODUCING A COATED GLASS FIBER STRAND
Alfred Marzocchi, Cumberland, R.I., assignor to Owens-Corning Fiberglas Corporation
Continuation of application Ser. No. 4,160, Jan. 9, 1970, which is a continuation of application Ser. No. 563,010, June 20, 1966, which in turn is a continuation-in-part of application Ser. No. 234,639, Nov. 1, 1962. This application Dec. 24, 1970, Ser. No. 101,397
Int. Cl. D06n 11/00
U.S. Cl. 156—148                    8 Claims

ABSTRACT OF THE DISCLOSURE

A method of coating glass fibers which consists of applying a primary size consisting essentially of water and a wetting agent to the individual fibers, forming the fibers into a strand, drying the strand, and applying a different, but compatible second coating to the strand, whereby the second coating penetrates interstices between the fibers adjacent to the surface only of the strand. This leaves a highly mobile core. The method makes possible the constant utilization of forming equipment, which is stabilized for greater efficiency of operation and perfection of product.

---

This application is a streamlined continuation of application S.N. 4,160, filed Jan. 9, 1970, now abandoned, which in turn is a streamlined continuation of application S.N. 563,010, filed June 20, 1966, now abandoned, which in turn is a continuation-in-part of application S.N. 234,639, filed Nov. 1, 1962, now abandoned.

THE PROBLEM

Heretofore, glass fibers have been custom tailored to their end use, at the point of formation; namely, at the bushing.

As will be obvious to those skilled in the art, analogy to a glass melting tank can be made. Thus, once charged and set up, the melting bushing is capable of producing only one end-use product. This means that in manufacturing, if a short run of a specialized material is required, a bushing must be particularly set up for the operation. This requires changing the size applicator, cleaning the size system, and replenishing with a size adapted to the specific end use for which the special production run is made. This is a time consuming and costly operation entailing down time, man hours and the like. Also, there is inevitably a substantial effort involved in cleaning a size system including lines, mixing vessels, pumps, and the like; also, there is a waste of the material contained in the equipment which has to be dumped.

Then, when the short run is completed, cleanup must again be effected to change the equipment back to the higher production materials.

This is analogous to dumping a 100 ton glass tank when it is desired to change from clear glass to a short run of tinted glass. In other words, a 200 ton total dump is required; first to remove the clear glass and run in the tinted glass and then to remove the tinted glass and run the clear glass back in again.

Accordingly, an important advance to the art would be provided by a method for applying sizes to continuous fibers, such as glass fibers, wherein one size is used at the bushing for formation and then a second size is superimposed on this one universal size just prior to the point of final production. Novel products produced by such operation would also provide a substantial contribution to the art as will become apparent.

In accordance with the present invention the secondary size only partially penetrates the precoated strand. This is brought about by the fact that the secondary size is applied over an innocuous or universal size that has been, at least, partially to substantially completely dried and put into a storage package. Some further drying, of course, takes place in the package. Thus, the secondary size is not applied to the nascent surfaces of the strand because they have been previously coated. Thus, a novel product, having a highly mobile core, is provided with a case or shell of secondary size united to the fibers at the outer areas of the strand. The secondary size, therefore, only partially penetrates the interstices between the surface fibers of the strand.

It is an important object of the present invention to provide a method for processing fibers.

A further object is to provide a method for sizing fibers wherein a universal size is applied at the point of formation.

A further object is to provide a method for forming continuous fibers and sizing the same wherein a universal size is applied at the point of formation, followed by drying and overcoating the strand with a secondary size, compatible with the first size and also an end use at a subsequent point of processing.

Other objects of this invention will appear in the following description and appended claims, reference being had to the accompanying drawings forming a part of this specification wherein like reference characters designate corresponding parts in the several views.

FIG. 1 is a side elevation view of apparatus for producing continuous glass fibers;
FIG. 2 is a front elevation of FIG. 1;
FIG. 3 is a schematic illustration of the method of invention;
FIG. 4 is a fragmentary front elevation showing application of a secondary size to a strand of invention;
FIG. 5 is a side elevation of FIG. 4;
FIG. 6 is an enlarged sectional view of a fiber containing the universal size coating film in accordance with the invention;
FIG. 7 is a greatly enlarged sectional view of a finished strand of invention fabricated into a resin laminate; and,
FIG. 8 is a perspective end view on a smaller scale, further illustrating the strand of FIG. 7.

Briefly, the present invention relates to a method of applying sizes to individual glass fibers that can be called a universal size process; wherein a universal or innocuous or an all-compatible size is applied at the point of formation of the fibers, so that all forming equipment is constantly utilized, and stabilized for greatest efficiency of operation and utmost perfection of product.

The universal size added is characterized by long storage life in the package, and compatibility with a large number of subsequent sizes, as needed for specific end-use applications. The so-produced formed product is forwarded to storage and thence to end-use operations, such as twisting, plying and the like, at which time the particular end-use size is applied as an overcoat on the original, universal, forming size-containing strand.

In view of the foregoing introduction, the environmental surroundings of the present invention will now be provided.

THE ENVIRONMENT

By reference to FIGS. 1 and 2 of the drawings, production of fibers as known in the art is described.

As shown in these figures, continuous glass fibers 10 are formed utilizing a bushing 12, heated as hereinafter described to provide a body molten glass 14. Thus, the bushing 12 is provided with electrical terminals 16 at each end, FIG. 2, to which electrical lines 18 and 20 are connected whereby electrical current is passed through the bushing to heat the same by its own resistance. An insulating refractory 22 is provided around the bushing 12 to retain heat and thereby improve efficiency.

Although not shown, a means for feeding glass marbles or powdered glass-forming materials typified by a suitable chute or hopper is provided above the bushing 12. Glass forming materials are thus fed by gravity into the bushing 12 at a controlled rate commensurate with the rate of fiber formation.

In the bushing 12, the glass-forming materials are converted into molten glass to provide the body 14, which exudes downwardly from apertures 24, formed in aligned array along the bottom of the bushing, as small molten streams 26. The streams 26 are attenuated into the fibers 10 and these are passed into tangential contact with the sizing belt 28, operating over a roll 30 and guide 32. The roll 30 is positioned within a size container 34 that contains a body of liquid size 36, with the bottom portion of the roll 30 being immersed in the liquid size; thus, as the belt 28 passes over the roll 30 it is wetted to transfer the size to the fibers 10 during their tangential passage over the belt at the guide 32. An inlet conduit 38 supplies fresh size to the container 34 and an exhaust conduit 40 returns the size to a central source for recirculation, purification and enrichment to assure a fresh, clean supply.

A depending arm 42, attached to the size container 34, supports a gathering guide 44 that takes the form of a small wheel having a V-groove in the periphery and that is made of wear-resistant material such as graphite. A wheel form is used in the guide 44, so that as wear develops, the wheel can be indexed to bring a new gathering surface into position for accurate fiber gathering.

After the fibers 10 pick up a coating of size by contact with the wetted belt 28 at the guide 32, they are converged into a strand 46 by the V-periphery of the gathering guide 44.

It will be noted from the foregoing that individual contact is provided at 32 for application of a surrounding coating to each fiber.

The strand 46 is then passed downwardly to a cylindrical collet 48 that is adapted to be rotated at high speeds by a motor, not shown, but contained within a cabinet 50 for protection against water and other materials used in the forming room. The collet 48 carries a tube 52 upon which the strand 46 is wound, being directed back and forth over the surface of the tube as the latter is rotated on the collet by a traverser 54, to form a package 56.

From the foregoing, it will be understood that rotation of the collet 48 and the tube 52 to wind the strand 46 provides the attenuating force by which the small streams 26 are drawn out into the extremely fine fibers 10.

Movement of the strand 46 in a to-and-fro manner across the surface of the package 56 by the traverser 54 provides point contact between successive turns of the strand and thereby prevents sticking of the turns to one another when the liquid binder and size, applied at point 32, is dried.

It is upon the foregoing environmental background that the present invention is premised and a complete description will now be provided.

THE INVENTION

As previously mentioned, a liquid sizing material 36 is applied to each fiber 10 just before the point 44 of formation into the strand 46. The purpose of this sizing material is important and multifold in the fiber forming art. Thus, it provides strand integrity by holding the fibers to one another in the high speed subsequent winding operation. Also, the size provides inter-fiber lubrication, so that fiber-to-fiber friction is reduced to a level whereby the fibers do not abrade one another during the winding operation and subsequent processing, and therefore, strand integrity is preserved.

Further, in accordance with the present invention, the sizing material is so selected that it is subsequently compatible with a broad number of secondary sizes, the latter being adapted for specific end uses. It will be noted at this point that the size contemplated within the scope of the present invention is a so-called universal size which is applied at forming and is compatible with the broad range of subsequent overcoat sizes to be applied, depending upon specific end uses to be satisfied.

Accordingly, the present invention concerns itself with an innocuous or universal size to be provided at forming and to each individual fiber. In accordance with the invention, this has been found to be principally utilized as water, with a small amount of wetting agent optionally applied thereto to provide a couple to the surfaces of the glass fibers. One specific material is a mixture of cationic lubricant or softener (wetting agent) comprising tetraethyl pentamine stearate, commonly referred to as Cat X; and sodium alginate, commonly referred to as Algin, as an innocuous or universal size. The sodium alginate is a sodium salt of a polysaccharide of low molecular weight, and is very soluble in water. Very good strand integrity is provided by using this material.

Having set the stage for the invention in which a suitable or universal size is employed at the outset, or forming, reference is now made to FIG. 3 of the drawings wherein the foregoing discussion is briefly reviewed and integrated into subsequent steps of processing.

THE METHOD OF FIGURE 3

By reference to this figure of the drawings, it will be observed that a schematic flow diagram is provided illustrating the various steps involved in the process of the present invention.

Actually, the process illustrated in FIG. 3 is of twofold aspect as follows:

(1) The method of producing fibers; and,
(2) The method of processing such fibers by a subsequent sizing operation and preparing the secondary sized fibers for particular end uses.

By reference to FIG. 3, it will be noted that the various method steps within the total scope of invention thus include the following:

(A) Melting glass;
(B) Forming fibers from the melted glass;
(C) Applying a universal size for initial strand formation, strand integrity, and fiber-to-fiber friction reduction;
(D) Form strand;
(E) Package; and,
(F) Add secondary, end-use size and process into intermediate or finished product.

In the light of the foregoing, a full and complete description of each stage and the coordination of the stages in the overall process will now be provided.

Step A.—Melt glass: The manner of melting the glass in a high temperature bushing, made of platinum, iridium or analogous alloy has been discussed hereinbefore.

Step B.—Fiber forming: This step is included within the scope of operation of drawing molten streams of glass at a rapid rate into continuous fibers of very small diameter.

Step C.—Apply universal size: Universal size, typified by water or water containing a wetting agent or agents, such as Cat X, is provided in order to assure strand integrity and reduce fiber-to-fiber abrasion for subsequent package forming and to provide adequate storage life between forming and subsequent end-use processing at a later time.

This is applied to the individual fibers while they are in cone form.

Step D.—Form strand: The initially and individually sized fibers are then directed into a coherent strand, the size being utilized for strand formulation, and for strand integrity, as pointed out before.

Step E.—Packaging: The final step in the initial formation of the fibers comprises the production of a suitable package, typified by analogy to a large spool of household sewing thread; a typical package having a weight of about 4 to 6 pounds with the strands crossed over one another to prevent strand-to-strand adherence. As pointed out above, the universal size is substantially dried in the storage package.

At this point it should be noted that a particular advantage of the invention resides in the fact that the initial innocuous size provides little other than a monomolecular layer of water and a water-wetting agent and, thus, the fibers are actually rendered almost a bit repulsive to one another, thereby providing a highly mobile core, while nevertheless being sufficiently associated to form an integral strand. More is made of this latter.

THE SECOND PRINCIPAL STAGE OF THE PROCESS

Step F.—Application of end-use size: For purposes of clarity, Step F is broken down into subcategories F–1; F–2; F–3; and, F–4. These represent processing of various end-use products in accordance with the present invention.

Step F–1.—Twisting size: For the production of twisted strands and/or yarns, a size, typified by an aqueous-base starch and lubricant-containing formulation is added to the strand as it is processed upon the twisting frame during a twisting and plying operation. This is designated Step F–1–1.

A typical aqueous-base starch size contains dextrinized starch, as follows:

| Ingredients: | Parts per hundred |
| --- | --- |
| Dextrinized starch | 10 |
| Hydrogenated corn oil lubricant | 2 |
| Tween 81—emulsifier for the oil | .2 |
| Cat X—cationic lubricant, tetraethyl pentamine stearate | .25 |
| Polyvinyl alcohol | .1 |
| Gelatin | .05 |
| Water | 87.4 |
| pH—adjusted with acetic acid or ammonia; suitable bactericide added for appropriate shelf life. | |

Step F–1–2 involves the actual twisting and plying of one or more of the F–1–1 strands to provide either a wild or balanced yarn.

Step F–1–3 then optionally contemplates the removal of the size, as for the production of certain dyed materials, or the retention of the size to make the dye more compatible with the glass.

This aspect of the invention encompasses addition of a twist-enhancing size on top of an innocuous forming size to advance the art.

Another useful twist-enhancing size formulation comprises polyvinyl acetate and water with a suitable wetting agent such as Triton X-100. Also, aqueous emulsions of waxes can be utilized. These would include most any kind of wax in emulsion form. Additionally, molten, high-melting paraffinic waxes can be utilized.

STEP F–2.—Weave and twist size: This branch of the method of the present invention contemplates the addition of a secondary weave and twist size for strand twist and ply and subsequent weaving of yarn into yard goods, typified by drapery materials.

The materials enumerated above as twist-enhancing sizes also can be used for secondary weave and twist sizes. Also, a clear aqueous solution of polyvinyl alcohol can be utilized. In addition, solvent solutions of waxes, polyethylene glycol and the like can be used. In this category, also, are polypropylene oxide polymers, polyethylene oxide polymers, and the like.

Thus, Step F–2–1 comprises the addition of a weave and twist size to a strand at the twist frame, during but just prior to the actual twist and ply operation.

Step F–2–2 follows and comprises the twisting and/or plying subsequent to secondary size addition.

Step F–2–3 comprises the subsequent weaving of the secondarily sized and processed yarn.

Step F–2–4 could then include lamination with a resin.

A summary of Step F–2 would indicate that a new and improved approach to processes of the prior art has been provided, wherein the initial forming size had to be removed as during a "Coronizing" operation, and the fibers then subsequently treated to render them resin-compatible. It will be obvious at this point that the simple steps of adding a resin-compatible size in the second stage, which is also compatible with the universal innocuous size applied during fiber forming, substantially simplifies operational procedures and avoids the prior task of size removal with retreatment to render the fibers resin-compatible.

Typical resin-compatible sizes would comprise coupling agents, including silanes such as gamma-aminopropyltriethoxysilane for resin wet out. Solutions and emulsions of epoxy and polyester resins also would be operable as secondary sizes since they would be compatible with the initially applied innocuous size.

It is believed from the foregoing that a definite advancement to the tart is thereby provided in accordance with the present invention.

STEP F–3.—Resin-compatible twist and ply size: Step F–3–1 contemplates the addition of a resin-compatible twist and/or ply size, whereby a plastisol or resin in plasticizer-solvent vehicle carrier can be subsequently applied to twisted and plied strand as for the production of woven screen forming materials, coated rovings and the like.

A typical plastisol-compatible size would comprise dibutyl phthalate, which is a plasticizing agent for polyvinyl chloride resin. Thus, within the scope of the invention, the secondary size can be plasticizer for a subsequently applied synthetic resin, to provide better bonding between the resin and the strand and impart unique pliability or flexibility to the ultimate product. Also, dibutyl phthalate is compatible with polyethylene oxides.

Regarding this step, it is to be understood that the resin-compatible size is applied at the twisting frame and is selected from ultimate compatibility with the plastisol or coating to be subsequently applied to the strand.

Step F–3–2 contemplates the twisting and plying of the sized material; and,

Step F–3–3 comprises the formation of a coated strand as by running through a plastisol bath, graphite suspension, paint or other suitable overcoating material.

A specific example of a plastisol bath is polyvinyl chloride plasticized with dibutyl phthalate. A graphite suspension comprises graphite suspended in water with a wetting agent.

STEP F–4.—Roving formation: Step F–4–1 contemplates the addition to the "universal" strand, either with or without twisting, of a roving forming size; that is, a size which will produce roving integrity by adherence between a multiplicity of side-by-side parallel strands twisted or untwisted, as desired.

A suitable roving-forming size comprises approximately 3 wt. percent of polyvinyl acetate in water suspension with about .2 percent of cationic lubricant and 2 percent of methacrylato chromic chloride complex. This is a polyester resin compatible size for reinforced plastics.

Another resin-compatible roving size comprises the following formulation, which is particularly adapted for producing reinforced epoxy resin laminates:

Ingredient: Percent by weight
- Saturated polyester resin _____ 3.0
- Polyvinyl alcohol _____ 0.1
- Wetting agent (lauric acid amide reacted with 16 mols of ethylene oxide—Nopcogen 16L) ____ 0.1
- Polyvinyl pyrolidone _____ 0.5
- Gamma-aminopropyltriethoxysilane _____ 0.3
- Acetic acid in an amount sufficient to adjust the composition to a pH of 4.5±.5.
- Remainder water.

Further description of this size and related materials, and its preparation and use, are found in my U.S. Pat. 2,931,739. As used herein, the term "epoxy resins" is intended to include resinous materials which, in most cases, are based upon epichlorohydrin and bisphenyl A. The product contains both epoxide and hydroxyl groups capable of further reaction. The term "epoxy resins" has acquired a distinctive and well-defined meaning and classification in the art and a fuller description of epoxy resins of the type which may be employed in the process of this invention can be found in Modern Plastics Encyclopedia, 1955 issue, pages 101–105, and the references cited therein.

It could also well be that within this aspect of the scope of the invention, the roving size could be one which tends to cause the fibers to be dispersed one from the other when the roving is chopped, as for the production of reinforced plastic laminates. Such a size would cause the fibers to disperse or "fuzz" at least at the points of chopping or impact with a cutter or brusing knife and thereby produce improved laminates by providing "fuzzed" ends for greater wet out.

A suitable size of this nature is Konrite A (trade name), a derivative of coconut oil. Also, polyamines can be used for this purpose; and polyethylene glycol of high molecular weight also can be used.

SUMMARY

It is to be understood from the foregoing that the processing techniques involved will include the production of a number of different end products from an initially universally sized starting material. Thus, the invention has proven commercially utility.

ILLUSTRATIVE SECONDARY COATING APPARATUS AND METHOD

By reference to FIGS. 4 and 5 of the drawings, one typical method and apparatus for applying the secondary size, as at the twist frame, is illustrated.

Thus, the strand 46 as from a stored forming package, typified by 56, FIGS. 1 and 2, is moved past the pad applicator 64. This sutiably includes a holder 66 over which a wool pad 67 is stretched. The wool pad 67 is kept saturated wtih a liquid size applied from a conduit 68.

The secondarily coated strand is designated 70 and proceeds to the twist frame or other processing device.

Optional drying, as when necessary, can be provided by an exemplary infra-red producer 71, hot air jet or other.

THE PRODUCT

Typical products produced in accordance with the present invention are illustrated by the highly magnified sectional views of FIGS. 6, 7 and 8.

Thus, as shown in FIG. 6, a single fiber is represented by the number 10, and the layer coating 58 represents a thin microscopic or monomolecular film of universal size, or water, as the case may be.

By reference to FIGS. 7 and 8, the manner in which such an individual coated fiber forms a component of novel products of invention is illustrated.

Thus, over the size layer 58, there is a film or layer 60 of secondary size, which in actuality may be understood to partially displace the film 58 of universal size, thereby producing an even stronger coupling with the actual base or bare surface of the fiber itself.

Note that the secondary size, since it is applied to a precoated strand as distinguished from individual bare fibers in their nascent state, will only partially penetrate to the center of the strand. This provides a unique product wherein a highly mobile core is retained yet where a different case or covering is provided that is positively coupled to the surface fibers only of the strand. Also, the secondary size, being compatible with the resin overlay, is positively coupled to the resin overlay. Thus, the secondary size only partially penetrates the interstices between the surface fibers 10 of the strand; and the same is true of the resin overlay, but to a lesser degree. Note the dimension 61 in FIG. 8 which represents secondary size penetration. Accordingly, the highly mobile core is preserved.

Further, the procedure provides great leeway and flexibility as to the secondary materials that can be used. Thus, a substantial advance to the art is provided by this invention.

Over the secondary size coating 60, there is provided the subsequently applied resin coating, plastisol or the like, designated by the reference numeral 62.

As shown in FIG. 7, the outer coating 62 may be a fragmentary portion of a matrix, as when the primary and secondarily coated strands are embedded in a synthetic resin laminate, or as when a chopped roving or strand is used as a lamination reinforcement. These products are typified by molded resin-fiber chairs, resin-fiber molded boat hulls and analogous products.

EXTENDED SCOPE OF THE INVENTION

While the foregoing description has alluded to the production of strand by secondarily sizing or coating a universally sized strand, thus avoiding the prior art necessity of removing forming sizes to facilitate twisting, weaving, resin-compability and roving formations, it is to be considered within the broad scope of the invention that these sizes can be readily removed after the secondary operations of twisting, weaving and so forth have been effected, but are applied to facilitate such operations. Removal is contemplated within the present invention where a subsequent processing step will absolutely require a "naked" strand in a certain fabricated product but will require that it has been previously twisted or configured for its ultimate use.

The broad scope of the invention is to be understood as regards the secondary sizes, to be inclusive of materials carried in an organic or volatile solvent system. A particularly important advantage of the present invention thus resides in this operation, inasmuch as such volatile solvent materials can be applied without hazard, since they are utilized during twisting or subsequent operations out of proximity to the high temperature bushing-forming areas, likely to cause explosions.

Materials which can be applied over the secondary sizes in accordance with the present invention, and thus with which the secondary sizes are compatible, includes the following:

Epoxy and polyester resins: These would be compatible with previously applied epoxy and polyester formulations in the form of emulsions and solutions.

Silicones: These would be compatible with polyvinyl acetate as a secondary size.

Synthetic elastomer (rubbers), plastisols, fluorocarbons, nylons, polyvinyl chlorides and polyvinyl acetate. These would be compatible with acetone and alcohols as secondary sizes. The reason that these secondary sizes are compatible with the innocuous size is that the innocouous size is dried, for practical purposes, to a monomolecular layer of water and cationic lubricant. Th secondary size is, therefore, effective to at least partially combine with, or at least partially displace, the innocuous size. Therefore, the foregoing elastomers, etc., applied either as solutions, emulsions, and as solvent solutions, will partially combine with the secondary size to partially displace the monomolecular layer of innocuous size, and bond to the exposed surface of the glass.

I claim:

1. In a method of producing a coated strand comprised of a plurality of fibers grouped together in adjacent, side-by-side coherent relation, the steps of: forming a plurality of fibers in isolated spaced relation and in an uncoated condition, applying a primary coating to each fiber to substantially completely encase the fiber, the primary coating consisting essentially of water and a glass-surface wetting agent, merging the fibers into side-by-side relationship to form a strand, drying to a degree retaining strand coherency, and thereafter applying a second coating to the outside of said coherent strand, the second coating combining with the primary coating on the surfaces of the outer fibers and only partially penetrating the interstices of the strand.

2. The method recited in claim 1 wherein the fibers are formed of glass.

3. The method recited in claim 2 including placing the strand into a forming package after the application of the primary coating, and storing the forming package for a period of time before applying the second coating.

4. The method recited in claim 2 wherein the secondary coating is a weave and twist size, followed by the steps of weaving, size removal, and the application of a finish treatment.

5. The method recited in claim 3 wherein the secondary coating is a weave and twist size, followed by the steps of weaving, size removal, and the application of a finish treatment.

6. The method recited in claim 2 wherein the secondary size is a material selected from the group of polyvinyl acetate emulsified in water, wax emulsified in water, wax as a hot melt, wax in solvent solution, polyvinyl alcohol in aqueous solution, polyethylene glycol, polypropylene oxide polymers, polyethylene oxide polymers in solvents solution, silanes, solutoins and emulsions of epoxy and polyester resins and polyvinyl acetate, and a plastisol compatible material, comprising a plasticizer.

7. The method recited in claim 2 wherein the secondary size is a roving-forming size selected from the group of a derivative of coconut oil, polyamines and polyethylene glycol of high molecular weight, which is effective to retain the fibers in integral strand form, and is capable of autogenously repelling the fibers at a point of sharp impact to the strand.

8. In a method of producing a coated strand comprising a plurality of glass fibers adhered to one another in adjacent, side-by-side relation, the steps of: forming a plurality of glass fibers in isolated spaced relation, applying a primary coating to each fiber in substantially complete encasing relation in the nascent state of the fiber, the primary coating consisting essentially of water and a glass-surface wetting agent, merging the fibers into side-by-side relationship to form a strand, placing the strand into a forming package, drying and removing the strand from the package, applying a different but compatible second coating to the outside of the strand without appreciably displacing the first coating from the surface of the fibers of the strand, and encasing the so-formed strand in an end use resin.

References Cited

UNITED STATES PATENTS

| | | | |
|---|---|---|---|
| 2,256,380 | 9/1941 | Dickey | 252—351 X |
| 2,736,676 | 2/1956 | Frickert, Jr. | 161—72 |
| 3,192,089 | 6/1065 | Clark | 57—153 X |
| 3,295,942 | 1/1967 | Smock et al. | 161—58 X |
| 2,323,684 | 7/1943 | Simison | 161—176 |
| 2,446,119 | 7/1948 | White et al. | 117—124 |
| 2,671,744 | 3/1954 | Biefield et al. | 156—180 |
| 2,723,215 | 11/1955 | Biefield et al. | 161—202 |
| 2,801,189 | 7/1957 | Collier | 117—72 |
| 3,090,102 | 5/1963 | Jannarelli | 161—89 |
| 3,206,924 | 9/1965 | Mennerich | 57—164 |
| 3,227,192 | 1/1966 | Griffiths | 139—420 |

ROBERT F. BURNETT, Primary Examiner

L. C. KOECKERT, Assistant Examiner

U.S. Cl. X.R.

57—164; 117—76 T, 90, 92, 126 GR; 156—180; 161—176